United States Patent
Lin et al.

(10) Patent No.: US 6,560,524 B2
(45) Date of Patent: May 6, 2003

(54) INTEGRATION OF REAR WHEEL STEERING WITH VEHICLE STABILITY ENHANCEMENT SYSTEM

(75) Inventors: William Chin-Woei Lin, Troy, MI (US); Yuen-Kwok Chin, Troy, MI (US); David Michael Sidlosky, Huntington Woods, MI (US); David S. Rule, Orchard Lake, MI (US); Weiwen Deng, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/963,770

(22) Filed: Sep. 26, 2001

(65) Prior Publication Data

US 2003/0060959 A1 Mar. 27, 2003

(51) Int. Cl.[7] .............................. G06F 7/00; G06F 17/00
(52) U.S. Cl. ............................ 701/70; 180/6.2; 303/140
(58) Field of Search .................... 701/70, 72; 180/204, 180/6.2, 6.24, 400, 408; 303/140, 146

(56) References Cited

U.S. PATENT DOCUMENTS

| | | | | |
|---|---|---|---|---|
| 5,105,899 A | * | 4/1992 | Mori et al. ................. | 180/415 |
| 5,228,757 A | * | 7/1993 | Ito et al. .................... | 303/146 |
| 5,343,393 A | * | 8/1994 | Hirano et al. ............... | 180/413 |
| 5,506,776 A | * | 4/1996 | Fushimi et al. ............. | 180/413 |
| 5,508,921 A | | 4/1996 | Chickuma et al. | |
| 5,524,079 A | * | 6/1996 | Ishida et al. ................ | 180/412 |
| 5,606,502 A | * | 2/1997 | Adachi et al. .............. | 180/408 |
| 5,627,754 A | * | 5/1997 | Asanuma et al. ........... | 180/408 |
| 5,652,379 A | * | 7/1997 | Fukatani ..................... | 701/99 |
| 5,720,533 A | | 2/1998 | Pastor et al. | |
| 5,745,862 A | * | 4/1998 | Hirano ........................ | 180/410 |
| 5,816,669 A | * | 10/1998 | Hiwatashi et al. .......... | 303/122 |
| 6,035,251 A | | 3/2000 | Hac et al. | |
| 6,041,886 A | | 3/2000 | Nakaishi et al. | |
| 6,056,371 A | | 5/2000 | Lin et al. | |
| 6,079,800 A | | 6/2000 | Lin et al. | |
| 6,131,688 A | * | 10/2000 | Fukada ....................... | 180/197 |
| 6,175,790 B1 | | 1/2001 | Lin et al. | |
| 6,205,374 B1 | * | 3/2001 | Kljima et al. .............. | 307/10.4 |
| 6,230,084 B1 | * | 5/2001 | Kijima et al. .............. | 307/10.4 |
| 6,233,513 B1 | * | 5/2001 | Furukawa et al. .......... | 303/146 |
| 6,280,008 B1 | * | 8/2001 | Yoshida ..................... | 303/113.2 |
| 6,334,656 B1 | * | 1/2002 | Furukawa et al. .......... | 303/140 |
| 6,345,218 B1 | * | 2/2002 | Yamanaka et al. .......... | 180/204 |

* cited by examiner

Primary Examiner—William A. Cuchlinski, Jr.
Assistant Examiner—Olga Hernandez
(74) Attorney, Agent, or Firm—Kathryn A. Marra (57) ABSTRACT

There is disclosed a method for integrating a vehicle stability enhancement system and rear wheel steering. The method includes inputting a vehicle speed and measured vehicle yaw rates. Determining a front and rear wheel steer angle. Calculating a desired yaw rate. Comparing the measured yaw rate with the desired yaw rate to determine a yaw error term. Applying a braking force to a wheel of a vehicle imparting a yaw moment based upon the magnitude of the error term calculated. The rear wheel steer angle is taken into account in calculating a desired yaw rate.

21 Claims, 5 Drawing Sheets

INTEGRATION OF REAR WHEEL STEERING WITH VEHICLE STABILITY ENHANCEMENT SYSTEM

FIELD OF THE INVENTION

The present invention relates to a vehicle with rear wheel steering control and active brake control. More particularly, the present invention relates to a vehicle wherein the rear wheel steering control and active brake control are integrated to produce optimal vehicle performance.

BACKGROUND OF THE INVENTION

Recently, vehicles have been produced with brake systems that actively apply brakes to individual wheels in an effort to improve vehicle stability or handling. Many new vehicles also include rear wheel steering which enhances the vehicle maneuverability at low speed and the vehicle stability at high speed via control of the rear wheel steering angle.

However, when these two systems are included on a vehicle, the systems need to be integrated such that the control actions of both systems are not conflicting such that undesirable vehicle handling is achieved.

For example, an active brake control system compares the vehicle yaw rate measurement with a computed desired vehicle yaw rate during a vehicle maneuver, and forms an error term to decide and command a proper amount of differential braking for stabilization of the vehicle during the maneuver. If the state of rear wheel steering is not accounted for when computing the desired vehicle yaw rate, the computation may result in an erroneous value such that when compared with the vehicle yaw rate measurement there will be a significant error term even though the vehicle is handling correctly. The active brake control system in this circumstance would command an undesired differential braking which would result in poor vehicle performance.

As another example, if the rear wheel steering commands an out of phase steering with the front steering in a low speed region, or an in phase steering in a high speed region, vehicle handling and stability may be compromised. Although an out of phase steering enhances the vehicle's maneuverability under normal driving conditions, there is a tendency to oversteer when maneuvering at a limit condition. Similarly, an in phase steering stabilizes vehicle maneuverability under normal driving conditions, but it has a tendency to promote understeer when maneuvering at a limit condition. Therefore, when a vehicle is operated at the limit conditions where active brake control usually takes effect, the active brake control and rear wheel steering systems need to be integrated such that they do not provide conflicting controls that would result in less than optimal vehicle performance.

Therefore, it is a purpose of this invention to provide an integration of rear wheel steering with a vehicle stability enhancement system such that there is a proper interchange of information between the two systems that results in an optimum vehicle performance.

SUMMARY OF THE INVENTION

The present invention is directed to an improved method for integrating a vehicle stability enhancement system and rear wheel steering. The method includes the steps of: inputting a vehicle speed, inputting a measured vehicle yaw rate, determining a front wheel steer angle, determining a rear wheel steer angle, calculating a desired yaw rate, comparing the measured yaw rate with the desired yaw rate to determine a yaw rate error term, and thereafter applying a braking force to a wheel of the vehicle to impart a yaw moment based upon the magnitude of the error term calculated and wherein the rear wheel steer angle is accounted for in calculating the desired yaw rate.

The method for integrating a vehicle stability enhancement system and rear wheel steering has the advantage of including the rear wheel steer angle in calculating a desired yaw rate, such that optimal vehicle performance can be maintained.

The method for integrating a vehicle stability enhancement system and rear wheel steering has the further advantage of providing an improved hand wheel position centering algorithm that includes the effects of rear wheel steering.

As a further advantage, the method for integrating a vehicle stability enhancement system and rear wheel steering provides rear wheel steering control during active brake control that includes terms within the algorithm to compensate for over steering and under steering.

DETAILED DESCRIPTION OF THE INVENTION

Figure 1:
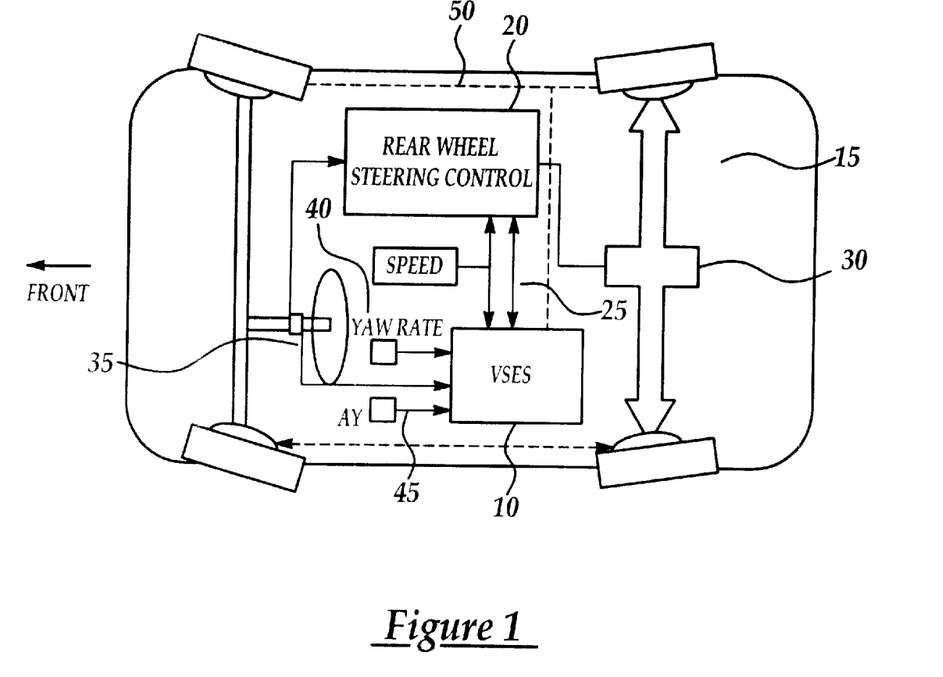
FIG. 1 is a diagram of a vehicle having a vehicle stability enhancement system and a rear wheel steering system that are integrated in accordance with present invention.

With reference to FIG. 1, there is shown a vehicle 5 including a vehicle stability enhancement system 10 and rear wheel steering system 15 that includes a rear wheel steering control 20. As can be seen in FIG. 1, the rear wheel steering control 20 and the vehicle stability enhancement system 10 are integrated such that there is a system communication 25 depicted by the double arrows. The rear wheel steering control 20 is in communication with a rear wheel steering actuator 30 for providing adjustment of the rear wheel steering angle. The rear wheel steering control 20 is also in communication with a hand wheel angle sensor 35. The vehicle stability enhancement system 10 receives inputs including a vehicle yaw rate 40 and a lateral acceleration 45. The vehicle stability enhancement system 10 provides control signals to a brake control 50 depicted by the dashed lines leading to the individual wheels.

Figures 5, 6:
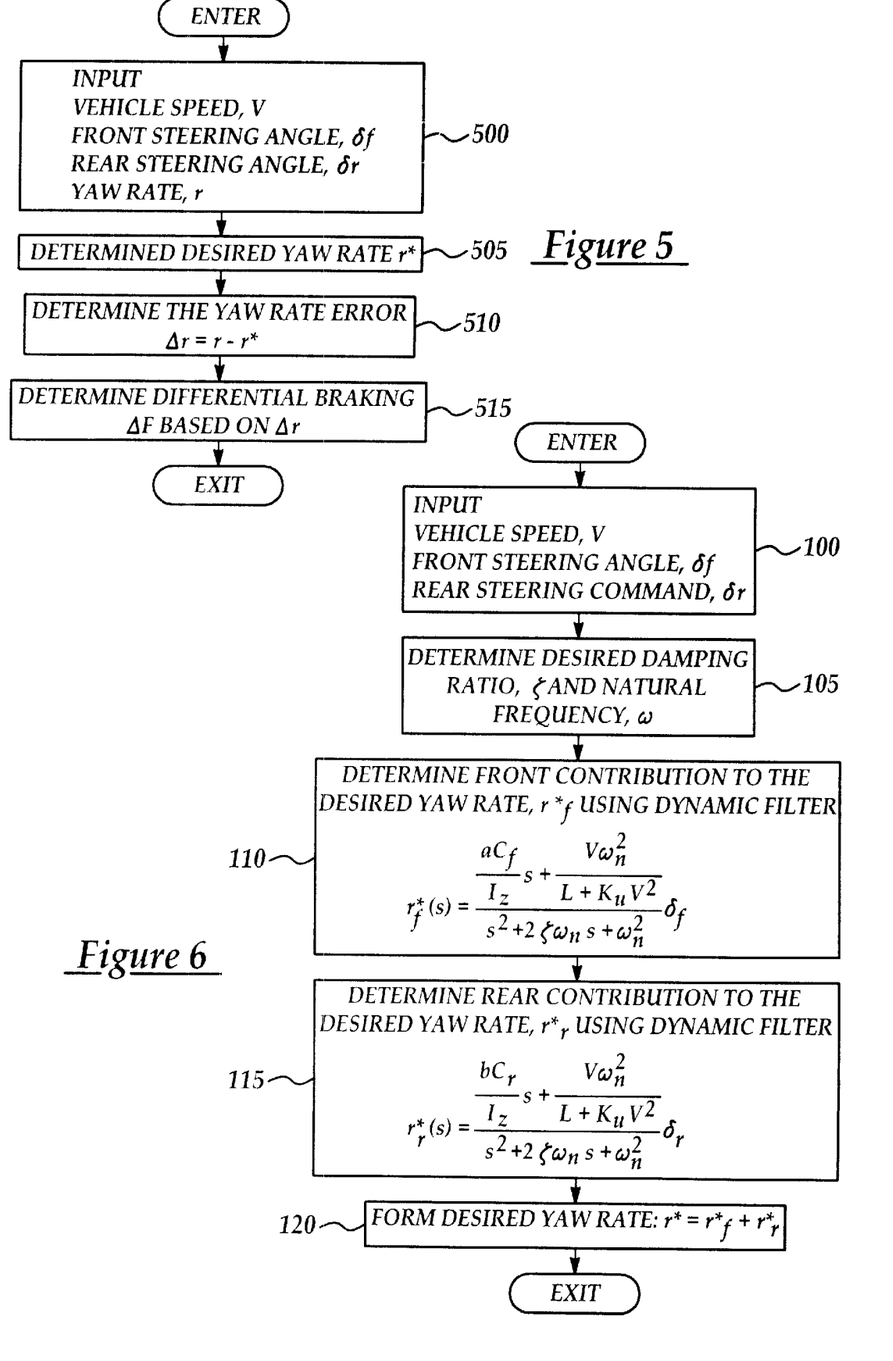
FIG. 5 is a flow diagram detailing the differential braking control of the vehicle stability enhancement system.
FIG. 6 is a flow diagram detailing the algorithm for determining a desired yaw rate taking into account rear wheel steering variables.

With reference to FIG. 6, there is shown a flow diagram for determining a desired yaw rate in accordance with the present invention. At block 100, inputs from the various sensors depicted in FIG. 1 are read and processed to form variables useful in determining a desired yaw rate. Specifically, the input signals include a vehicle speed V, a front steering angle $\delta_f$ and a rear steering command $\delta_r$. The input signals are filtered and wheel speeds are used to determine vehicle speed, while the front steering angle and rear steering commands are determined according to functions which will be detailed below. Again with reference to FIG. 6, in block 105 a desired damping ratio and natural frequency are determined. The yaw rate can generally be computed according to:

$$R^* = \delta_f V/(L+K_U V^2)$$ Equation 1:

Wherein V is the vehicle speed.
$\delta_f$ is the front wheel steer angle.
$K_u$ is the vehicle understeer coefficient.
L is the vehicle wheel base length.
The vehicle yaw rate in steady state is represented by the following equation and takes into account the dynamic behavior of the vehicle:

$$R^*(s) = [[(aC_f/I_z)(s)+(V\omega_n^2/L+K_uV^2)]/[s^2+2\zeta\omega_n s+\omega_n^2]]\delta_f(s)$$ Equation 2:

$\omega_n$ is the desired vehicle natural frequency.
$\zeta$ is the desired vehicle dynamic damping ratio,
$C_f$ is the front axle cornering stiffness,
$C_r$ is the rear axle cornering stiffness,
a and b are the front and rear distances from the front and rear axle to the center of gravity, respectively,
$I_z$ is the vehicle yaw inertia,
and s is a frequency domain mathematical operator.

The previous two equations 1 and 2 given above, however, do not take into account when a rear wheel steering is active and the rear steer angle, $\delta_r$ is present to further effect the vehicle yaw rate. Therefore, according to this invention, the desired steady state yaw rate is modified to include the rear wheel steer angle according to the following equation:

$$R^* = (\delta_f - \delta_r)V/(L+K_uV^2)$$ Equation 3:

As can be seen from the above equation, the rear wheel steer angle $\delta_r$ is subtracted from the front wheel steer angle to provide a more accurate desired yaw rate. Incorporating the modified equation 3 into the steady state representation of equation 2 yields the following equation for the desired dynamic yaw rate response:

Equation 4:
$$R^*(s) = [[(aC_f/I_z)(s) + (V\omega_n^2/L + K_uV^2)]/[s^2 + 2\zeta\omega_n s + \omega_n^2]]\delta_f(s) - [[(bC_r/I_z)(s) + (V\omega_n^2/L + K_uV^2)]/[s^2 + 2\zeta\omega_n s + \omega_n^2]]\delta_r(s)$$

The additional consideration of the rear steer angle in the computation of the desired vehicle yaw rate improves the determination and makes it more compatible with an actual vehicle yaw rate that is measured during normal driving conditions. Without the introduction of the rear wheel steer angle terms, significant discrepancy can result between the desired yaw rate and the actual yaw rate leading to a differential braking commanded by the vehicle stability enhancement system, when in fact, none is required.

Figure 7:
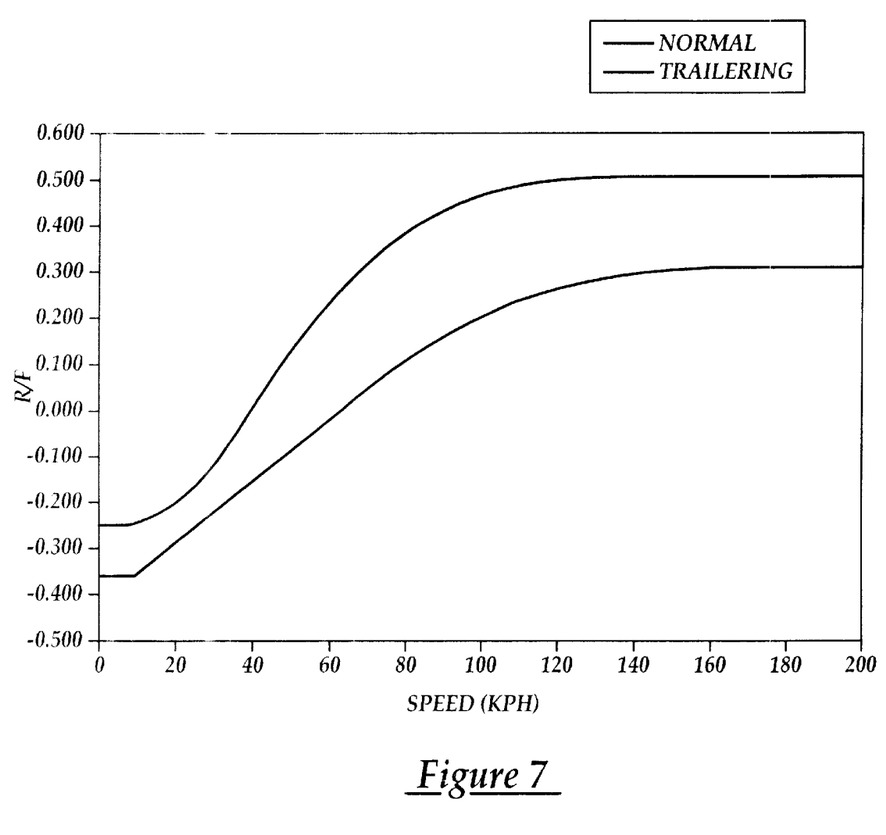
FIG. 7 is a graph detailing a rear wheel gain curve plotted at various speeds.

While the implementation of equations 3 and 4 detailed above requires measurement of the rear wheel steering angle, alternatively, a rear wheel steer gain may be utilized without direct measurement of the rear wheel steering angle. The rear wheel steering angle and front wheel steering angles have the following relationship:

$$\delta_r = \delta_f(G_{r/f})$$ Equation 5:

With reference to FIG. 7, there is shown a typical curve depicting the rear wheel steer gain, $G_{r/f}$ plotted as a function of vehicle speed. Utilizing the values associated with such a curve, the steady state yaw rate can be implemented using the rear wheel steering gain without the measurement of the rear wheel steering angle according to the following equation:

$$R^* = \delta_f(1-G_{r/f})V/(L+K_uV^2)$$ Equation 6:

Again, the modified dynamic yaw rate including the interaction of rear wheel steering may be calculated according to the following equation without the measurement of a rear wheel steering angle:

Equation 5:
$$R^*(s) = [[(aC_f/I_z)(s) +(V\omega_n^2/L + K_uV^2)]/[s^2 + 2\zeta\omega_n s + \omega_n^2]]\delta_f(s) - [[(bC_r/I_z)(s) + (V\omega_n^2/L + K_uV^2)]/[s^2 + 2\zeta\omega_n s + \omega_n^2]]\delta_f(s)(1-G_{r/f})$$

Again with reference to FIG. 6, in block 110 the front contribution to the desired dynamic yaw rate is calculated. In block 115, the rear contribution to the desired dynamic yaw rate is calculated. In block 120, the desired yaw rate is calculated by adding the front and rear contributions to the desired yaw rate.

Figure 4:
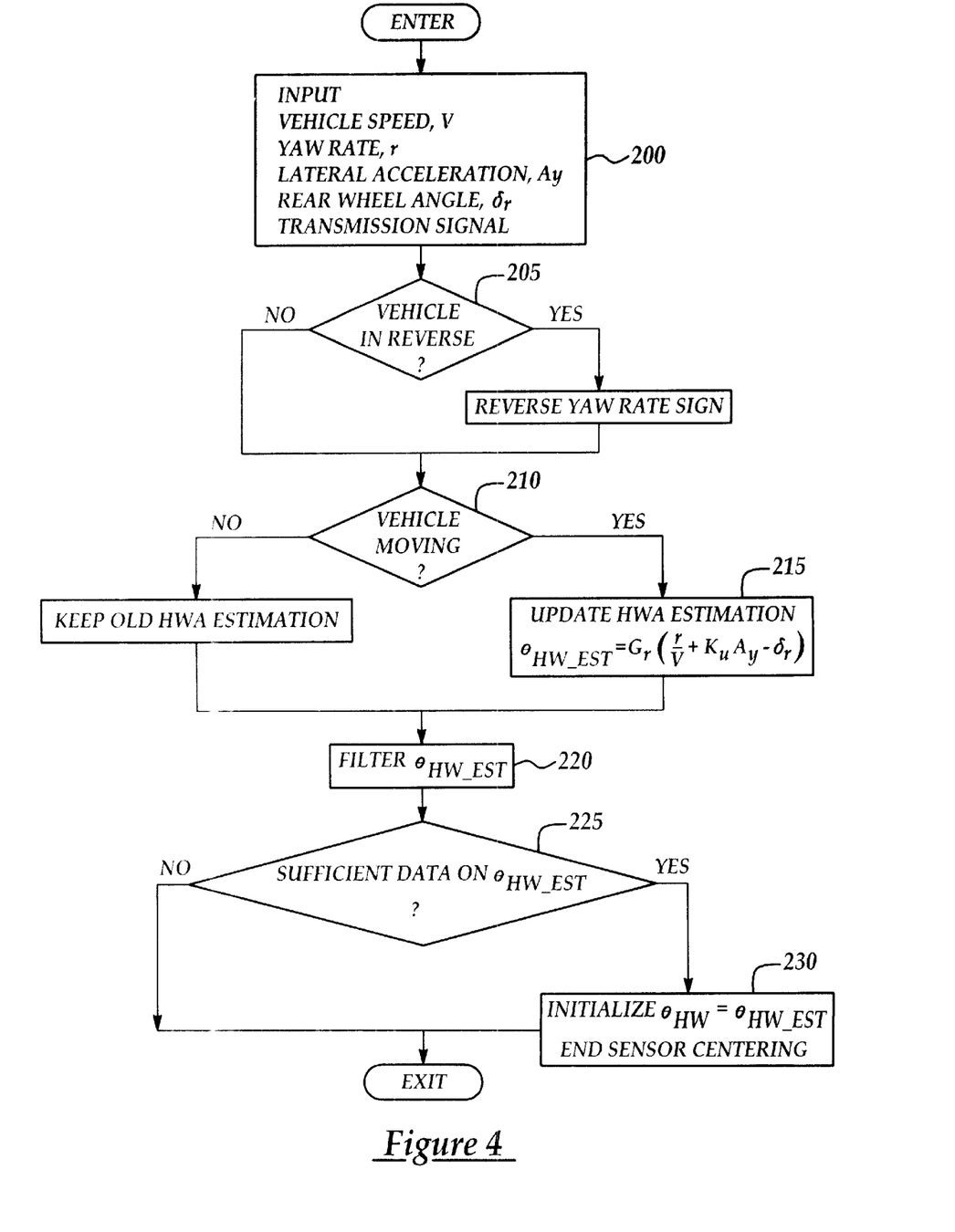
FIG. 4 is a flow diagram detailing the hand wheel sensor centering algorithm.

With reference to FIG. 4, there is detailed a flow diagram of a hand wheel sensor centering algorithm. To have an effective control of vehicle stability utilizing active brake control or a vehicle stability enhancement system, a system needs to have a precise reading of the hand wheel position such that an accurate desired vehicle yaw rate can be calculated. The hand wheel position sensor in relation to a control scheme needs to recognize the relation between a sensor signal and the absolute position of the hand wheel. The process of obtaining such a relationship is called centering. With reference to FIG. 4, in block 200 inputs from various sensors depicted in FIG. 1 are read and processed to form variables useful in the hand wheel sensor centering algorithm. Those variables include vehicle speed, yaw rate, lateral acceleration, rear wheel steering angle, and a transmission signal.

The centering algorithm utilizes information on the vehicle yaw rate, lateral acceleration, vehicle speed, together with an understeer coefficient, and computes a nominal front wheel steer angle, $\delta_f^*$ according to the following equation:

$$\delta_f^* = (r/V) + K_u a_y$$ Equation 8:

The above computation is performed under a restrictive condition to assure that the vehicle is not undergoing severe maneuvers that may alter such a calculation. If the vehicle is not undergoing such a severe condition, the nominal value of the front wheel steer angle computed according to the above equation is recognized as the true front wheel steer angle and a value of the hand wheel position, $\theta_{HW}$ can be recognized by the following equation:

$$\theta_{HW} = G_r \delta_f^*$$ Equation 9:

Wherein $G_r$ is a steering gear ratio.

However, the above-represented equations can result in erroneous evaluation of a nominal front wheel steer angle when rear wheel steering is present that affects part of the yaw rate contributed by the rear wheel steering. Therefore, according to this invention, the nominal front wheel steer angle needs to be corrected by taking into account the rear wheel steer angle according to the following equation:

$$\delta_f^* = (r/V) + K_u a_y - \delta_r \quad \text{Equation 10:}$$

As with the calculation of the desired yaw rate, the calculation of a nominal front wheel steer angle may utilize the rear wheel steering gain, $G_{r/f}$ without the direct measurement of the rear wheel steering angle $\delta_r$ and may be implemented according to the following equation:

$$\delta_f^* = (r/V) + K_u a_y/(1+G_{r/f}) \quad \text{Equation 11:}$$

Again with reference to FIG. 4, in blocks 205 and 210 it is determined whether the vehicle is in reverse and moving, respectively. Next in block 215, the hand wheel steer angle is estimated according to a combination of equations 9 and 10. After the estimated hand wheel steering angle has been calculated in block 215, the signal is filtered in block 220. Next in block 225, it is determined whether there is sufficient data to indicate that the vehicle is not in a severe maneuver and thus provide an accurate estimated hand wheel angle. In block 230, the estimated hand wheel angle is assigned as the true hand wheel angle and ends the process of sensor centering.

The rear wheel steer angle is based on a calculation including the front wheel steer angle and a gain table that is a function of vehicle speed. When the vehicle speed is low, the gain is negative resulting in an out of phase steering of the rear wheel. When the vehicle speed is high, the gain is positive resulting in an in phase steering of the rear wheel. Out of phase steering will allow the vehicle to be able to turn in a much tighter circle increasing the vehicle's maneuverability at low speeds. However, when an oversteer condition exists and the vehicle is operating at the limit of surface adhesion, an excessive yaw rate may be generated as compared to the desired yaw rate. In such a situation, an increase in vehicle maneuverability becomes undesirable and the vehicle becomes more difficult to straighten during a maneuver. This situation may be improved by reducing the effect of the out of phase steering when the active brake control of the vehicle stability enhancement system has indicated an oversteer condition.

Likewise, when an understeer condition occurs and the vehicle fails to develop yaw motion corresponding to the desired yaw rate, the effect of the in phase steering should be reduced. As a result, the differential braking commanded by the active brake control is more effective in assisting the vehicle to attain the desired yaw rate without the counteracting conditions of the rear wheel steering.

Within the active brake control system of the vehicle stability enhancement system, the controller monitors the vehicle dynamic response via chassis sensors, such as vehicle yaw rate sensors and lateral acceleration sensors. Based on the sensor information and in conjunction with information from a hand wheel position sensor and vehicle speed information, the vehicle stability enhancement control determines whether the vehicle response to a steering command is an understeer situation or an oversteer situation. The active brake control then uses this information to determine whether or not to engage differential braking. In order to integrate the rear wheel steer system and the active brake control, the information of understeer or oversteer conditions is taken into account by the rear wheel control system to further change the rear wheel steer gain such that the above conditions are minimized.

Figure 2:
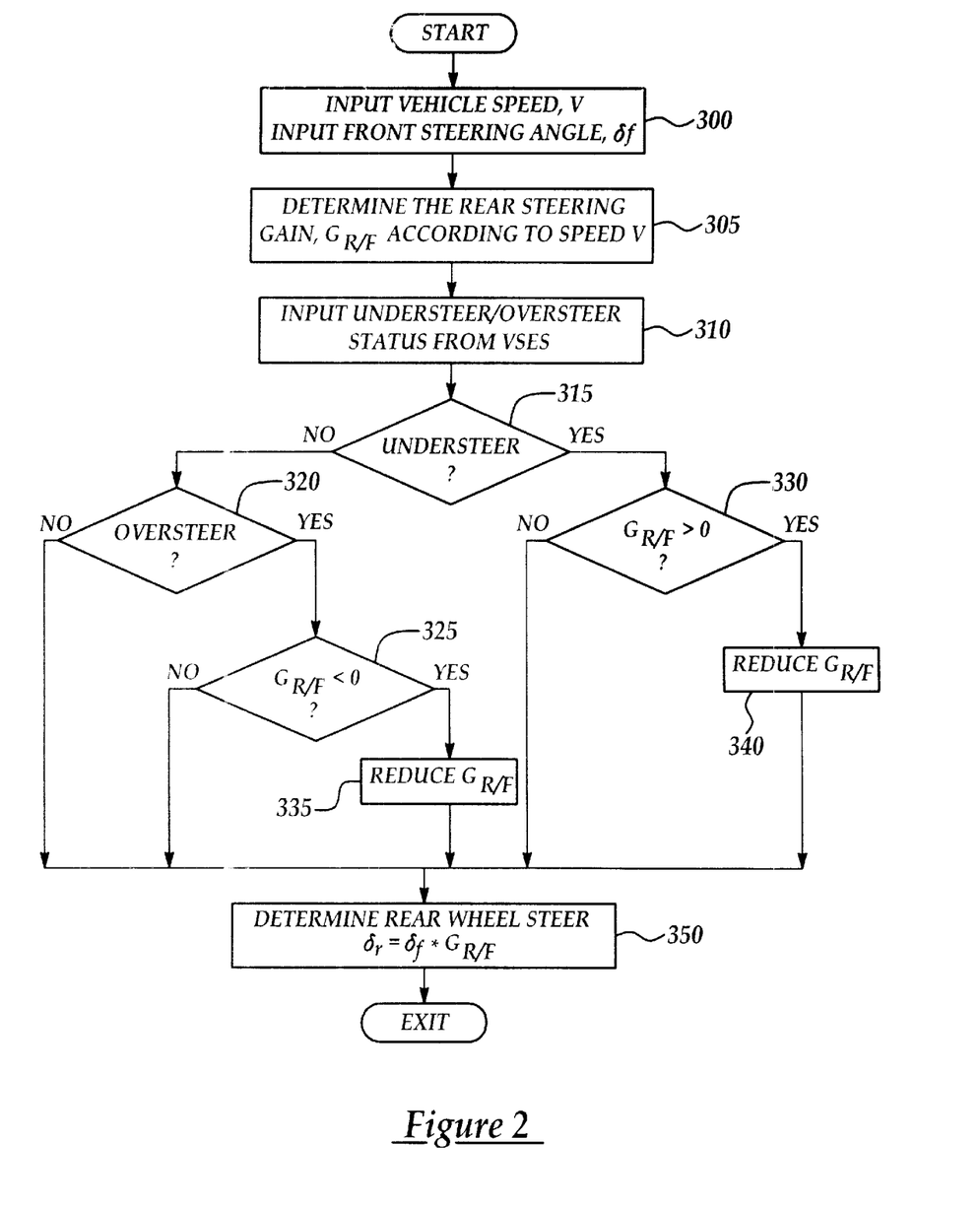
FIG. 2 is a flow diagram for improving rear wheel steering control that includes determining of an,understeer or an oversteer condition.

With reference to FIG. 2, there is shown a flow diagram of a rear wheel steering control. In block 300, variables such as the vehicle speed and front steering angle are inputted. In block 305, the rear wheel steering gain is calculated as a function of vehicle speed. Next, in block 310 the vehicle stability enhancement system inputs whether there is an understeer or oversteer condition. In blocks 315 through 340, the rear wheel steer gain is either reduced or remains the same depending on the various oversteer or understeer conditions. In block 350 the rear wheel steer angle is determined by multiplying the front wheel steer angle and the rear wheel steer gain determined above.

Figure 3:
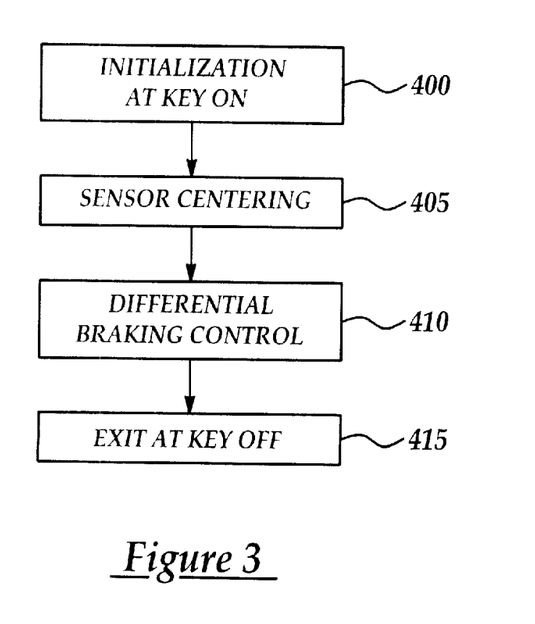
FIG. 3 is a flow diagram detailing the overall control of the vehicle stability enhancement system.

In operation, the vehicle stability enhancement system is detailed in FIG. 3 by a flow diagram. With reference to FIG. 3, in block 400 the vehicle stability enhancement system is initialized. Next, in block 405 the sensor centering algorithm corresponding to the flow diagram of FIG. 4 is performed. In block 410, a differential braking control function is performed that will be detailed below. The vehicle stability enhancement system is exited in block 415.

With reference to FIG. 5, the differential braking control function is depicted by a flow diagram. In block 500 various inputs including vehicle speed, front steering angle, rear steering angle, and vehicle yaw rate are inputed. Next, in block 505 a desired yaw rate is determined according to the flow diagram of FIG. 6. Next, in block 510, a yaw rate error is determined between the measured vehicle yaw rate and the desired vehicle yaw rate. The vehicle stability enhancement system then determines in block 515 whether to implement a differential braking based on the yaw rate error term calculated in block 510.

The present invention has been described in accordance with the relevant legal standards, thus the foregoing description is exemplary rather than limiting in nature. Variations and modifications to the disclosed embodiments may become apparent to those skilled in the art. Accordingly, the scope of legal protection afforded this invention can be determined by studying the following claims.

We claim:

1. A method for integrating a vehicle stability enhancement system and rear wheel steering, the method comprising the steps of:
   a) inputting a vehicle speed;
   b) inputting a measured vehicle yaw rate;
   c) determining a front wheel steer angle;
   d) determining a rear wheel steer angle;
   e) calculating a desired yaw rate;
   f) comparing the measured yaw rate with the desired yaw rate to determine a yaw error term; and
   g) applying a braking force to a wheel of the vehicle to impart a yaw moment based upon the magnitude of the error term calculated wherein the rear wheel steering angle is taken into account in calculating the desired yaw rate.

2. The method for integrating a vehicle stability enhancement system and rear wheel steering of claim 1 wherein the step of determining a front wheel steer angle further includes the step of centering a hand wheel sensor.

3. The method for integrating a vehicle stability enhancement system and rear wheel steering of claim 2 wherein the step of centering the hand wheel comprises:
   a) inputting a vehicle speed;
   b) inputting a measured vehicle yaw rate;
   c) inputting a vehicle lateral acceleration;
   d) inputting a rear wheel steer angle;
   e) determining an estimated hand wheel position;
   f) determining if the vehicle is undergoing a severe maneuver;

g) assigning the estimated hand wheel position as the true hand wheel position;

h) calculating a front wheel steer angle according to the equation:

$$\delta_f^* = (r/V) + K_u a_y - \delta_r$$

wherein $\delta_f^*$ is the front wheel steer angle;
r is the measured vehicle yaw rate;
V is the vehicle speed;
$K_u$ is the under steer coefficient;
$a_y$ is the lateral acceleration; and
$\delta_r$ is the rear wheel steer angle.

4. The method for integrating a vehicle stability enhancement system and rear wheel steering of claim 3 wherein the step of calculating the front wheel steer angle utilizes a rear wheel steer gain such that the rear wheel steer angle does not need to be measured directly.

5. The method for integrating a vehicle stability enhancement system and rear wheel steering of claim 4 wherein the step of calculating the front wheel steer angle is according to the equation:

$$\delta_f^* = (r/V) + K_u a_y / (1 + G_{r/f})$$

wherein $\delta_f^*$ is the front wheel steer angle;
r is the measured vehicle yaw rate;
V is the vehicle speed;
$K_u$ is the under steer coefficient;
$a_y$ is the lateral acceleration; and
$G_{r/f}$ is the rear wheel steer gain.

6. The method for integrating a vehicle stability enhancement system and rear wheel steering of claim 1 wherein the step of determining a rear wheel steer angle comprises:

a) inputting a vehicle speed;
b) inputting a front steering angle;
c) determining a rear steering gain corresponding to the inputted vehicle speed;
d) determining if the vehicle is in an oversteer or an understeer condition;
e) adjusting the value of the rear steering gain based upon the determination of the oversteer or understeer condition and the value of the gain;
f) calculating the rear wheel steer angle according to the equation:

$$\delta_r = \delta_f (G_{r/f})$$

wherein $\delta_r$ is the rear wheel steer angle;
$\delta_f$ is the front wheel steer angle;
$G_{r/f}$ is the rear wheel steer gain.

7. The method for integrating a vehicle stability enhancement system and rear wheel steering of claim 1 wherein the desired steady state yaw rate is determined according to the equation:

$$R^* = (\delta_f - \delta_r) V / (L + K_u V^2)$$

wherein

R* is the desired yaw rate;
$\delta_f$ is the front wheel steer angle;
$\delta_r$ is the rear wheel steer angle;
V is the vehicle speed;
$K_u$ is the under steer coefficient; and
L is the vehicle wheel base length.

8. The method for integrating a vehicle stability enhancement system and rear wheel steering of claim 1 wherein the desired dynamic yaw rate is determined according to the equation:

Equation 4:

$$R^*(s) = [[(aC_f/I_z)(s) + (V\omega_n^2/L + K_u V^2)]/[s^2 + 2\varsigma\omega_n s + \omega_n^2]]$$
$$\delta_f(s) - [[(bC_r/I_z)(s) + (V\omega_n^2/L + K_u V^2)]/[s^2 + 2\varsigma\omega_n s + \omega_n^2]]\delta_r(s)$$

wherein

R* is the desired yaw rate;
$\delta_f$ is the front wheel steer angle;
$\delta_r$ is the rear wheel steer angle;
V is the vehicle speed;
$K_u$ is the under steer coefficient;
L is the vehicle wheel base length;
A and b are distances from the front and rear axles to the center of gravity respectfully;
$C_f$ is the front axle cornering stiffness;
$C_r$ is the rear axle cornering stiffness;
$I_z$ is the vehicle yaw inertia;
$\omega_n$ is the vehicle natural frequency;
$\varsigma$ is the vehicle dynamic damping ratio; and
s is a frequency domain mathematical operator.

9. The method for integrating a vehicle stability enhancement system and rear wheel steering of claim 8 wherein the step of calculating the desired vehicle yaw rate utilizes a rear wheel steer gain such that the rear wheel steer angle does not need to be measured directly.

10. The method for integrating a vehicle stability enhancement system and rear wheel steering of claim 9 wherein the desired dynamic yaw rate is determined according to the equation:

Equation 7:

$$R^*(s) = [[(aC_f/I_z)(s) + (V\omega_n^2/L + K_u V^2)]/[s^2 + 2\varsigma\omega_n s + \omega_n^2]]\delta_f(s) - $$
$$[[(bC_r/I_z)(s) + (V\omega_n^2/L + K_u V^2)]/[s^2 + 2\varsigma\omega_n s + \omega_n^2]]\delta_f(s)(1 - G_{r/f})$$

wherein

R* is the desired yaw rate;
$\delta_f$ is the front wheel steer angle;
$G_{r/f}$ is the rear wheel steer gain;
V is the vehicle speed;
$K_u$ is the under steer coefficient;
L is the vehicle wheel base length;
A and b are distances from the front and rear axles to the center of gravity respectfully;
$C_f$ is the front axle cornering stiffness;
$C_r$ is the rear axle cornering stiffness;
$I_z$ is the vehicle yaw inertia;
$\omega_n$ is the vehicle natural frequency;
$\varsigma$ is the vehicle dynamic damping ratio; and
s is a frequency domain mathematical operator.

11. A method of operation for an active brake control, the method providing an integration of rear wheel steering and active brake control such that a desired yaw rate term is calculated utilizing a formula including variables to account for rear wheel steering, the method including the steps of:
   a) inputting a vehicle speed;
   b) inputting a measured vehicle yaw rate;
   c) determining a front wheel steer angle;
   d) determining a rear wheel steer angle;
   e) calculating a desired yaw rate;
   f) comparing the measured yaw rate with the desired yaw rate to determine a yaw error term; and
   g) applying a braking force to a wheel of the vehicle to impart a yaw moment based upon the magnitude of the error term calculated wherein the rear wheel steering angle is taken into account in calculating the desired yaw rate.

12. The method of operation for an active brake control on a vehicle of claim 11 wherein the step of determining a front wheel steer angle further includes the step of centering a hand wheel sensor.

13. The method of operation for an active brake control on a vehicle of claim 12 wherein the step of centering the hand wheel comprises:
   a) inputting a vehicle speed;
   b) inputting a measured vehicle yaw rate;
   c) inputting a vehicle lateral acceleration;
   d) inputting a rear wheel steer angle;
   e) determining an estimated hand wheel position;
   f) determining if the vehicle is undergoing a severe maneuver;
   g) assigning the estimated hand wheel position as the true hand wheel position;
   h) calculating a front wheel steer angle according to the equation:

$$\delta_f^* = (r/V) + K_u a_y - \delta_r$$

wherein
   $\delta_f^*$ is the front wheel steer angle;
   $\delta r$ is the measured vehicle yaw rate;
   V is the vehicle speed;
   $K_u$ is the under steer coefficient;
   $a_y$ is the lateral acceleration; and
   $\delta_r$ is the rear wheel steer angle.

14. The method of operation for an active brake control on a vehicle of claim 13 wherein the step of calculating the front wheel steer angle utilizes a rear wheel steer gain such that the rear wheel steer angle does not need to be measured directly.

15. The method of operation for an active brake control on a vehicle of claim 14 wherein the step of calculating the front wheel steer angle is according to the equation:

$$\delta_f^* = (r/V) + K_u a_y/(1 + G_{r/f})$$

wherein
   $\delta_f^*$ is the front wheel steer angle;
   r is the measured vehicle yaw rate;
   V is the vehicle speed;
   $K_u$ is the under steer coefficient;
   $a_y$ is the lateral acceleration; and
   $G_{r/f}$ is the rear wheel steer gain.

16. The method of operation for an active brake control on a vehicle of claim 11 wherein the step of determining a rear wheel steer angle comprises:
   a) inputting a vehicle speed;
   b) inputting a front steering angle;
   c) determining a rear steering gain corresponding to the inputted vehicle speed;
   d) determining if the vehicle is in an oversteer or an understeer condition;
   e) adjusting the value of the rear steering gain based upon the determination of the oversteer or understeer condition and the value of the gain;
   f) calculating the rear wheel steer angle according to the equation:

$$\delta_r = \delta_f(G_{r/f})$$

wherein
   $\delta_r$ is the rear wheel steer angle;
   $\delta_f$ is the front wheel steer angle;
   $G_{r/f}$ is the rear wheel steer gain.

17. The method of operation for an active brake control on a vehicle of claim 11 wherein the desired yaw rate is determined according to the equation:

$$R^* = (\delta_f - \delta_r)V/(L + K_u V^2)$$

wherein
   $R^*$ is the desired yaw rate;
   $\delta_f$ is the front wheel steer angle;
   $\delta_r$ is the rear wheel steer angle;
   V is the vehicle speed;
   $K_u$ is the under steer coefficient; and
   L is the vehicle wheel base length.

18. The method of operation for an active brake control on a vehicle of claim 11 wherein the desired dynamic yaw rate is determined according to the equation:

$$R^*(s) = [[(aC_f/I_z)(s) + (V\omega_n^2/L + K_u V^2)]/[s^2 + 2\varsigma\omega_n s + \omega_n^2]]$$
$$\delta_f(s) - [[(bC_r/I_z)(s) + (V\omega_n^2/L + K_u V^2)]/[s^2 + 2\varsigma\omega_n s + \omega_n^2]]\delta_r(s)$$

wherein
   $R^*$ is the desired yaw rate;
   $\delta_f$ is the front wheel steer angle;
   $\delta_r$ is the rear wheel steer angle;
   V is the vehicle speed;
   $K_u$ is the under steer coefficient;
   L is the vehicle wheel base length;
   A and b are distances from the front and rear axles to the center of gravity respectfully;
   $C_f$ is the front axle cornering stiffness;
   $C_r$ is the rear axle cornering stiffness;
   $I_z$ is the vehicle yaw inertia;
   $\omega_n$ is the vehicle natural frequency;
   $\varsigma$ is the vehicle dynamic damping ratio; and
   s is a frequency domain mathematical operator.

19. The method of operation for an active brake control on a vehicle of claim 18 wherein the step of calculating the desired vehicle yaw rate utilizes a rear wheel steer gain such that the rear wheel steer angle does not need to be measured directly.

20. The method of operation for an active brake control on a vehicle of claim 19 wherein the desired dynamic yaw rate is determined according to the equation:

$$R^*(s) = [[(aC_f/I_z)(s) + (V\omega_n^2/L + K_u V^2)]/[s^2 + 2\varsigma\omega_n s + \omega_n^2]]\delta_f(s) - [[(bC_r/I_z)(s) + (V\omega_n^2/L + K_u V^2)]/[s^2 + 2\varsigma\omega_n s + \omega_n^2]]\delta_f(s)(1 - G_{r/f})$$

wherein
- $R^*$ is the desired yaw rate;
- $\delta_f$ is the front wheel steer angle;
- $G_{r/f}$ is the rear wheel steer gain;
- V is the vehicle speed;
- $K_u$ is the under steer coefficient;
- L is the vehicle wheel base length;
- A and b are distances from the front and rear axles to the center of gravity respectfully;
- $C_f$ is the front axle cornering stiffness;
- $C_r$ is the rear axle cornering stiffness;
- $I_z$ is the vehicle yaw inertia;
- $\omega_n$ is the vehicle natural frequency;
- $\varsigma$ is the vehicle dynamic damping ratio; and
- s is a frequency domain mathematical operator.

21. A method for integrating a vehicle stability enhancement system and rear wheel steering, the method comprising the steps of:
- a) inputting a vehicle speed;
- b) inputting a measured vehicle yaw rate;
- c) determining a front wheel steer angle;
- d) determining a rear wheel steer angle;
- e) calculating a desired yaw rate according to the equation:

$$R^*(s) = [[(aC_f/I_z)(s) + (V\omega_n^2/L + K_u V^2)]/[s^2 + 2\varsigma\omega_n s + \omega_n^2]]\delta_f(s) - [[(bC_r/I_z)(s) + (V\omega_n^2/L + K_u V_x^2)]/[s^2 + 2\varsigma\omega_n s + \omega_n^2]]\delta_f(s)(1 - G_{r/f})$$

wherein
- $R^*$ is the desired yaw rate;
- $\delta_f$ is the front wheel steer angle;
- $G_{r/f}$ is the rear wheel steer gain;
- V is the vehicle speed;
- $K_u$ is the under steer coefficient;
- L is the vehicle wheel base length;
- A and b are distances from the front and rear axles to the center of gravity respectfully;
- $C_f$ is the front axle cornering stiffness;
- $C_r$ is the rear axle cornering stiffness;
- $I_z$ is the vehicle yaw inertia;
- $\omega_n$ is the vehicle natural frequency;
- $\varsigma$ is the vehicle dynamic damping ratio; and
- s is a frequency domain mathematical operator
- f) comparing the measured yaw rate with the desired yaw rate to determine a yaw error term; and
- g) applying a braking force to a wheel of the vehicle to impart a yaw moment based upon the magnitude of the error term calculated.

\* \* \* \* \*